(12) United States Patent
Reisch et al.

(10) Patent No.: US 11,852,237 B2
(45) Date of Patent: Dec. 26, 2023

(54) ELECTROMECHANICAL ACTUATOR FOR GENERATING AN AXIAL ACTUATING FORCE

(71) Applicant: ZF Friedrichshafen AG, Friedrichshafen (DE)

(72) Inventors: Matthias Reisch, Ravensburg (DE); Andreas Füßl, Kressbronn am Bodensee (DE); Jürgen Wafzig, Bermatingen (DE); Andreas Wendzel, Grünkraut (DE); Lorenz Fischer, Friedrichshafen (DE); Holger Gohmert, Grünkraut (DE); Uwe Fehr, Friedrichshafen (DE); Michael Arnegger, Grünkraut (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/613,336

(22) PCT Filed: Mar. 6, 2020

(86) PCT No.: PCT/EP2020/055990
§ 371 (c)(1),
(2) Date: Nov. 22, 2021

(87) PCT Pub. No.: WO2020/233848
PCT Pub. Date: Nov. 26, 2020

(65) Prior Publication Data
US 2022/0221052 A1   Jul. 14, 2022

(30) Foreign Application Priority Data
May 23, 2019   (DE) .................. 10 2019 207 602.5

(51) Int. Cl.
*F16H 63/30*   (2006.01)
*H02K 11/215*   (2016.01)
(Continued)

(52) U.S. Cl.
CPC ........... *F16H 63/304* (2013.01); *F16H 25/20* (2013.01); *H02K 7/06* (2013.01); *H02K 11/215* (2016.01);
(Continued)

(58) Field of Classification Search
CPC ........ H02K 7/06; H02K 11/215; F16H 25/20; F16H 63/304
See application file for complete search history.

(56) References Cited

U.S. PATENT DOCUMENTS 3,161,074 A * 12/1964 Helmut ................. E05F 15/603
74/89.34
3,258,985 A * 7/1966 Jordan ................. F16K 31/047
74/388 R
(Continued)

FOREIGN PATENT DOCUMENTS

DE   102006049274 A1   4/2008
DE   102008062180 A1   9/2009
(Continued)

OTHER PUBLICATIONS

International Search Report (English Translation) PCT/EP2020/055990, dated May 14, 2020. (2 pages).

Primary Examiner — Joseph Brown
(74) Attorney, Agent, or Firm — Dority & Manning, P.A.

(57) ABSTRACT

An electro-mechanical actuator for generating an axial actuation force is provided. The electro-mechanical actuator includes an electric machine having a stator (1) and a rotor (2). The electro-mechanical actuator also includes a spindle drive with a rotary element (6) and with an element that is
(Continued)

movable in a translatory manner. A rotation of the rotary element (6) may result in a translatory motion of the element that is movable in a translatory manner. The rotor (2) and the rotary element (6) of the spindle drive are coupled to each other in a circumferential direction (U) such that a rotation of the rotor (2) results in a rotation of the rotary element (6) of the spindle drive (5). A rotational play (8) is formed between the rotor (2) and the rotary element (6) of the spindle drive in the circumferential direction (U).

17 Claims, 6 Drawing Sheets

(51) Int. Cl.
  *F16H 25/20* (2006.01)
  *H02K 7/06* (2006.01)
(52) U.S. Cl.
  CPC ............ *F16H 2025/2075* (2013.01); *F16H 2063/3063* (2013.01)

(56) References Cited

U.S. PATENT DOCUMENTS

| | | | | |
|---|---|---|---|---|
| 4,179,944 A | * | 12/1979 | Conner | H02K 7/06 192/141 |
| 9,017,419 B1 | * | 4/2015 | Landry | A61F 2/66 310/156.01 |
| 2001/0045783 A1 | * | 11/2001 | Hagiike | F16H 25/20 310/80 |
| 2008/0121833 A1 | * | 5/2008 | Weldon | H02K 7/06 310/90 |
| 2009/0241706 A1 | * | 10/2009 | Yuta | H02K 7/06 74/89.23 |
| 2010/0043586 A1 | | 2/2010 | Mohr et al. | |
| 2010/0162838 A1 | * | 7/2010 | Hirai | H02K 7/06 74/89.33 |
| 2010/0206103 A1 | * | 8/2010 | Duits | H02K 21/22 74/89.34 |
| 2011/0018371 A1 | * | 1/2011 | Huang | H02K 37/14 310/49.18 |
| 2011/0298323 A1 | * | 12/2011 | Brieschke | F16H 25/20 74/25 |
| 2013/0119786 A1 | * | 5/2013 | Muramatsu | H02K 7/06 310/12.27 |
| 2015/0082929 A1 | | 3/2015 | Isomura | |
| 2022/0221052 A1 | * | 7/2022 | Reisch | F16H 25/20 |

FOREIGN PATENT DOCUMENTS

| | | |
|---|---|---|
| DE | 102015211630 A1 | 12/2016 |
| JP | 2003222153 A | 8/2003 |

* cited by examiner

ELECTROMECHANICAL ACTUATOR FOR GENERATING AN AXIAL ACTUATING FORCE

CROSS-REFERENCE TO RELATED APPLICATIONS

The present application is related and has right of priority to German Patent Application No. 102019207602.5 filed in the German Patent Office on May 23, 2019 and is a nationalization of PCT/EP2020/055990 filed in the European Patent Office on Mar. 6, 2020, both of which are incorporated by reference in their entirety for all purposes.

FIELD OF THE INVENTION

The invention relates generally to an electro-mechanical actuator for generating an axial actuation force, in particular for an element of a motor vehicle transmission. The invention also relates generally to a motor vehicle transmission including the electro-mechanical actuator and to a motor vehicle including the motor vehicle transmission.

BACKGROUND

Due to the electro-mechanical actuation or operation of a transmission element, the fuel consumption of a motor vehicle can be reduced. There are special cases in which the actuation forces are particularly high. For shift actuators, the force required to disengage a gear at low temperature is frequently relevant to the design. This is due to the fact that a temperature-related, increased transmission drag torque is guided over the shift element to be disengaged and results in an increased friction force in a selector and sliding toothing, counter to which actuation must be carried out. These rare cases are decisive for the design. The design of the actuation device for appropriate shifting forces results in additional costs (actuator and power electronics), increased current consumption, and disadvantages with respect to installation space.

DE 10 2006 049 274 A1 describes electro-mechanical actuators, in which the rotation generated in an electric motor by a spindle drive is converted into a translatory motion. In order to obtain a desired actuating force in this way, an associated motor torque is necessary depending on the selected spindle ratio and the existing spindle efficiency. The electric motor is designed for this motor torque.

SUMMARY OF THE INVENTION

Example aspects of the present invention provide a cost-effective electro-mechanical actuator for generating an axial actuation force for an element of a motor vehicle transmission in such a way that the actuating force of the electro-mechanical actuator is increased relative to the size of the electro-mechanical actuator.

According to example aspects of the present invention, an electro-mechanical actuator having an increased actuating force due to the use of angular momentum is provided. The electro-mechanical actuator can be utilized for actuating an element of a motor vehicle transmission. In particular, it is provided to functionally situate rotational play between an electric machine and a spindle drive, and so, in the case of an excessive demand for actuating force at the electro-mechanical actuator, the electro-mechanical actuator is reset and the movement is repeated with momentum. When, due to the high demand for actuating force, the electro-mechanical actuator stands still and cannot rotate any further, the electro-mechanical actuator can reset within the rotational play and repeat the actuating movement with momentum. A return travel interlock can ensure, in the meantime, that actuation travel already achieved is not lost during the reset. Preferably, a self-locking spindle drive is provided as the return travel interlock.

In this sense, according to a first example aspect of the invention, an electro-mechanical actuator for generating an axial actuation force is provided, in particular for an element of a motor vehicle transmission. The electro-mechanical actuator includes an electric machine having a stator and having a rotor. The rotor is arranged, in particular, within the stator. In addition, the electro-mechanical actuator includes a spindle drive with a rotary element (spindle/spindle nut) and with an element that is movable in a translatory manner (spindle nut/spindle), wherein a rotation of the rotary element results in a translatory motion of the element that is movable in a translatory manner. The rotary element and the element that is movable in a translatory manner are appropriately coupled, for this purpose, in a manner known, per se, for example, by a buttress thread.

The rotor and the rotary element of the spindle drive are coupled to each other in a circumferential direction in such a way that a rotation of the rotor (in particular in a forward direction of rotation of the rotor) results in a rotation of the rotary element of the spindle drive. According to one advantageous example embodiment, a driving toothing is provided, by which the rotor and the rotary element of the spindle drive are coupled to each other.

When the rotor rotates in the forward direction of rotation, the rotary element of the spindle drive also rotates in the forward direction of rotation. As a result thereof, the element of the spindle drive that is movable in a translatory manner is displaced in the forward-facing axial direction. Due to this axial displacement, the element that is movable in a translatory manner can exert an actuation force upon an element of the motor vehicle transmission. In this way, in particular, idler gears of the motor vehicle transmission can be coupled to one another and decoupled from one another. In this way, for example, a first gearwheel can be brought into engagement with a second gearwheel when the rotor rotates in the forward direction of rotation and, as a result, directly drives the rotary element and indirectly drives the element that is movable in a translatory manner. When the rotor rotates in a reverse direction of rotation, which is in opposition to the forward direction of rotation, the rotary element of the spindle drive also rotates in the reverse direction of rotation, and so the element of the spindle drive that is movable in a translatory manner is now displaced in the rearward-facing axial direction, in order, in this way, to release the coupling between the two gearwheels.

According to example aspects of the present invention, it is provided that a rotational play between the rotor and the rotary element of the spindle drive is present in the circumferential direction. The rotational play can be structurally situated within the rotor. For example, the driving toothing can have rotational play between the rotor and the rotary element of the spindle drive in the circumferential direction. In particular, the driving toothing can have first teeth, which are arranged at the rotor, and second teeth, which are arranged at the rotary element of the spindle drive. A first tooth can be brought into engagement with an adjacent second tooth, wherein the rotational play is present between the first tooth and the second tooth. The rotational play can be described in degrees and can be, for example, twenty degrees (20°). This is merely by way of example, however.

Further possible values for the rotational play are, for example, ten degrees (10°), eleven degrees (11°), twelve degrees (12°), thirteen degrees (13°), fourteen degrees (14°), fifteen degrees (15°), sixteen degrees (16°), seventeen degrees (17°), eighteen degrees (18°), nineteen degrees (19°), twenty-one degrees (21°), twenty-two degrees (22°), twenty-three degrees (23°), twenty-four degrees (24°), twenty-five degrees (25°), twenty-six degrees (26°), twenty-seven degrees (27°), twenty-eight degrees (28°), twenty-nine degrees (29°) or thirty degrees (30°) or intermediate values thereof. The rotational play is, in particular, so great that the rotational play exceeds typical tolerances of a driving toothing.

This is, therefore, "intentional" rotational play. The rotational play is so great that the rotational play makes it possible to reset the rotor in the reverse direction of rotation within the scope of the rotational play and, thereafter, drive the rotor in the forward direction of rotation again within the rotational play, in order to impact the rotary element of the spindle drive with momentum. In this way, an angular momentum is transferred from the rotor onto the rotary element of the spindle drive. This rotational play can be utilized, in particular, for the case in which the rotor stands still due to a very high demand for actuating force, because the counter-torque of the rotary element of the spindle drive is greater than the torque of the rotor. Such a demand for actuating force may in fact be a case that only very rarely occurs, but this case must be taken into account in the design of the electric machine of the electro-mechanical actuator. In other words, the electric machine must be designed for the high demand for actuating force. In the case of electro-mechanical actuators known from the prior art, this results in relatively large electric machines. An example of such a high demand for actuating force is the operation at low temperature in connection with a temporarily unfavorable lube oil distribution, which results in an increased drag torque in the transmission. If this drag torque is guided over a dog or a synchronizer, the force required for actuation or operation of the dog or the synchronizer increases. Even though this situation rarely occurs in reality, the actuator system must be designed therefor, however, in particular the electric machine of the electro-mechanical actuator.

The advantage of the electro-mechanical actuator according to example aspects of the invention in comparison, for example, to mechanical striking mechanisms is that a rotational play can be implemented with a very low installation space requirement and cost-effectively. Depending on the structural surroundings, the rotational play can be situated in the rotor of the electric machine in an installation space-neutral manner. One further example advantage is that all necessary functions (commutation, striking mechanism function, travel measurement of the shift element) can be performed with only one angle sensor. In the case of a conventional striking mechanism, multiple sensors would be necessary, since the motor and the actuating element are temporarily decoupled.

In one example embodiment, the electro-mechanical actuator includes a return travel interlock for the spindle drive. The return travel interlock is configured for holding the spindle drive in place while the rotor is reset in the reverse direction of rotation. The return travel interlock can be implemented, in particular, in that the spindle drive is designed to be self-locking.

In one further example embodiment, the electro-mechanical actuator includes an electronic control unit. The electronic control unit can be integrated into the electro-mechanical actuator. The electronic control unit is configured for resetting the rotor within the rotational play in a reverse direction of rotation when the rotor is at a standstill due to an excessive counter-torque of the rotary element of the spindle drive, wherein the reverse direction of rotation is opposite the forward direction of rotation. In addition, the control unit is configured for driving the rotor in the forward direction of rotation once again after the rotor has been reset in the reverse direction of rotation, and so the rotor turns freely with respect to the rotary element of the spindle drive in the forward direction of rotation within the rotational play and drives the rotary element with momentum upon engagement of the driving toothing.

The rotating element of the spindle drive can include a spindle, and the element of the spindle drive that is movable in a translatory manner can include a spindle nut. The spindle and the spindle nut can be coupled to each other in such a way that a rotation of the spindle results in a translatory motion of the spindle nut. The driving toothing can include an internal toothing of the rotor and an external toothing of the spindle, wherein the external toothing engages into the internal toothing, and so a rotation of the rotor results in a rotation of the spindle drive, and wherein the rotational play is present between the internal toothing and the external toothing. According to this example embodiment, the spindle rotates with respect to the housing of the actuator.

In one further example embodiment, the rotating element of the spindle drive includes a spindle nut, and the element of the spindle drive that is movable in a translatory manner includes a spindle. The spindle and the spindle nut can be coupled to each other in such a way that a rotation of the spindle nut results in a translatory motion of the spindle, wherein the driving toothing includes an internal toothing of the rotor and an external toothing of the spindle nut, and wherein the rotational play exists between the internal toothing and the external toothing. According to this example embodiment, the spindle and the spindle nut are interchanged in such a way that the spindle nut, rather than the spindle, rotates with respect to the housing of the actuator. As a result, the spindle nut can be arranged and lengthened in the interior of the actuator without the installation length of the actuator increasing overall. Due to the lengthening of the spindle nut, the diameter of the spindle can be reduced while the surface stress in the threaded drive remains unchanged. As a result, the power transmission efficiency of the spindle drive improves and a greater axial force can be generated from unchanged torque of the actuator. Moreover, the moment of inertia of the rotary element of the spindle drive, in this case the spindle nut, can be further reduced, which results in a lower torque load of the driving toothing having play.

The rotor has a first rotating mass and the rotating element of the spindle drive has a second rotating mass. In one example embodiment, the first rotating mass and the second rotating mass are decoupled from each other by a torsional elasticity unit. The torsional elasticity unit can be an elastic element that has an elasticity in the circumferential direction. The torsional elasticity unit can be arranged, for example, between the driving toothing having play and a buttress thread of the rotary element of the spindle drive, in particular of the spindle. The torsional elasticity unit makes it possible that a major proportion of the moment of inertia of the rotary element of the spindle drive, for example, of the spindle, is elastically decoupled. As a result, the torque peaks occurring in the driving toothing upon impact can be limited in terms of magnitude. Therefore, the driving toothing can be designed to be smaller and the acoustic excitation is reduced. In this context, alternatively or additionally, it can also be provided that a first moment of inertia of the rotor is greater than a second moment of inertia of the rotary element of the spindle drive.

The electro-mechanical actuator can be at least partially arranged in the interior of a shaft. Effects, advantages, and embodiments associated therewith are described, for example, in DE 10 2006 049 274 A1 and U.S. Pat. No. 8,245,589B2, which is incorporated by reference herein. In addition, the electro-mechanical actuator can be rotationally fixed to the shaft, i.e., the electro-mechanical actuator rotates at a rotational speed of the shaft. The electro-mechanical actuator can include, furthermore, a brushless DC motor (BLDC motor) as the electric machine.

The rotor can be pressed against an axial guide bearing via a preloaded spring in a play-free manner. This example embodiment makes it possible that the axial mounting of the motor does not need to take place indirectly via, for example, the spindle, but rather can be implemented directly via abutting the axial guide bearing. The spring can have a preload. The preload of the spring can prevent the rotor from lifting off of the axial guide bearing in the axial direction. Due to this example embodiment, the axial position of the rotor can be highly precisely defined with a short tolerance chain and without the influence of bearing tolerances. This is advantageous, since an incorrect axial positioning of the sensor magnet, which is attached at the rotor, for example, via an adapter flange, can result in an inaccurate rotation-angle detection at the angle sensor and, thereby, in the case, for example, of a BLDC actuator, can result in a torque loss due to the commutation, which is dependent on the rotation angle.

The rotor can be mounted in the radial direction on the rotary element of the spindle drive, for example, on the spindle, which requires a particularly small amount of equipment. In addition, the radial mounting of the rotor can take place not exclusively, for example, on the spindle, but rather, for example, in the area of an end surface of the rotor by a radial bearing. In this sense, it can be provided in one example embodiment that the rotor is mounted on the rotary element of the spindle drive as well as in a radial bearing, wherein the radial bearing is arranged between the rotor and a housing of the electro-mechanical actuator. This enables a particularly direct mounting of the rotor and, thereby, a smaller air gap between the stator and the rotor. In addition, the moment of inertia of the spindle can be reduced as a result, which results in a reduction of the load of the driving toothing.

The rotary element of the spindle drive can be mounted in the axial direction and in the radial direction with respect to the housing of the actuator. For example, the spindle can be rotatably and axially fixedly mounted with respect to the housing of the actuator by a fixed bearing and by a floating bearing. As a result, the rotor can implement percussive movement upon the rotary element of the spindle drive in a manner that is free of axial forces, has low friction, and is reproducible.

The electro-mechanical actuator can also include a sensor, which is configured for detecting a rotation or a turning motion of the rotor. With the sensor, it can be monitored during an energization of the actuator whether the rotor rotates at a sufficiently high rotational speed. In the process, it can be detected that a sufficient rotation does not set in or that the rotor stands still (n=0). In this case, the electronic control unit can energize the electric motor for the opposite direction of rotation (reverse direction of rotation) in order to partly, although not completely, eliminate the structurally provided rotational play, in particular, of the driving toothing. The control unit can also be configured to energize the electric motor again, after the elimination of the rotational play (in the reverse direction of rotation), in the forward direction of rotation (direction of actuation) in order to build up kinetic energy and, thereafter, continue the actuating movement by way of an exchange of angular momentum between the rotor and the rotary element of the spindle drive.

The same sensor that is also used for detecting the rotation of the rotor and for the commutation of the motor can be utilized for detecting whether a turning motion effectively functions even without the above-described angular momentum. The detection of the turning motion can take place by observing the rotation angle by an angle sensor (for example, a Hall sensor) over a defined period of time. The sensor for detecting the rotation of the rotor can also be a current sensor, which can observe a current consumption of the electric motor over a defined period of time.

The electronic control unit can also redefine a period of time, within which it is observed whether a change of the rotation angle of the motor results during energization, from impact to impact (or from pulse to pulse). This yields an acoustic advantage, since not a single sound results, which in the least favorable case excites further components to resonate. Due to the different re-impact times, acoustically, rather, a noise arises. In addition, a performance advantage results, since the full waiting time, which would be necessary in order to unequivocally detect a possible pulse-free turning motion, does not need to elapse after every impact.

Moreover, the electronic control unit can be configured for carrying out the elimination of the rotational play in a timed manner. The elimination of the rotational play takes place without external resistances and, thereby, is well reproducible via timing-based control. An angle sensor sufficient for the commutation of the motor would generally deliver too little information for the rotation angle that is typically small during the elimination of the rotational play.

According to a second example aspect of the invention, a transmission for a motor vehicle is provided. The transmission includes an electro-mechanical actuator according to the first example aspect of the invention.

According to a third example aspect of the invention, a motor vehicle is provided, which includes a transmission according to the second example aspect of the invention.

BRIEF DESCRIPTION OF THE DRAWINGS

Exemplary embodiments of the invention are explained in greater detail in the following with reference to the diagrammatic drawing, wherein identical or similar elements are labeled with the same reference numbers, wherein.

DETAILED DESCRIPTION

Figure 1:
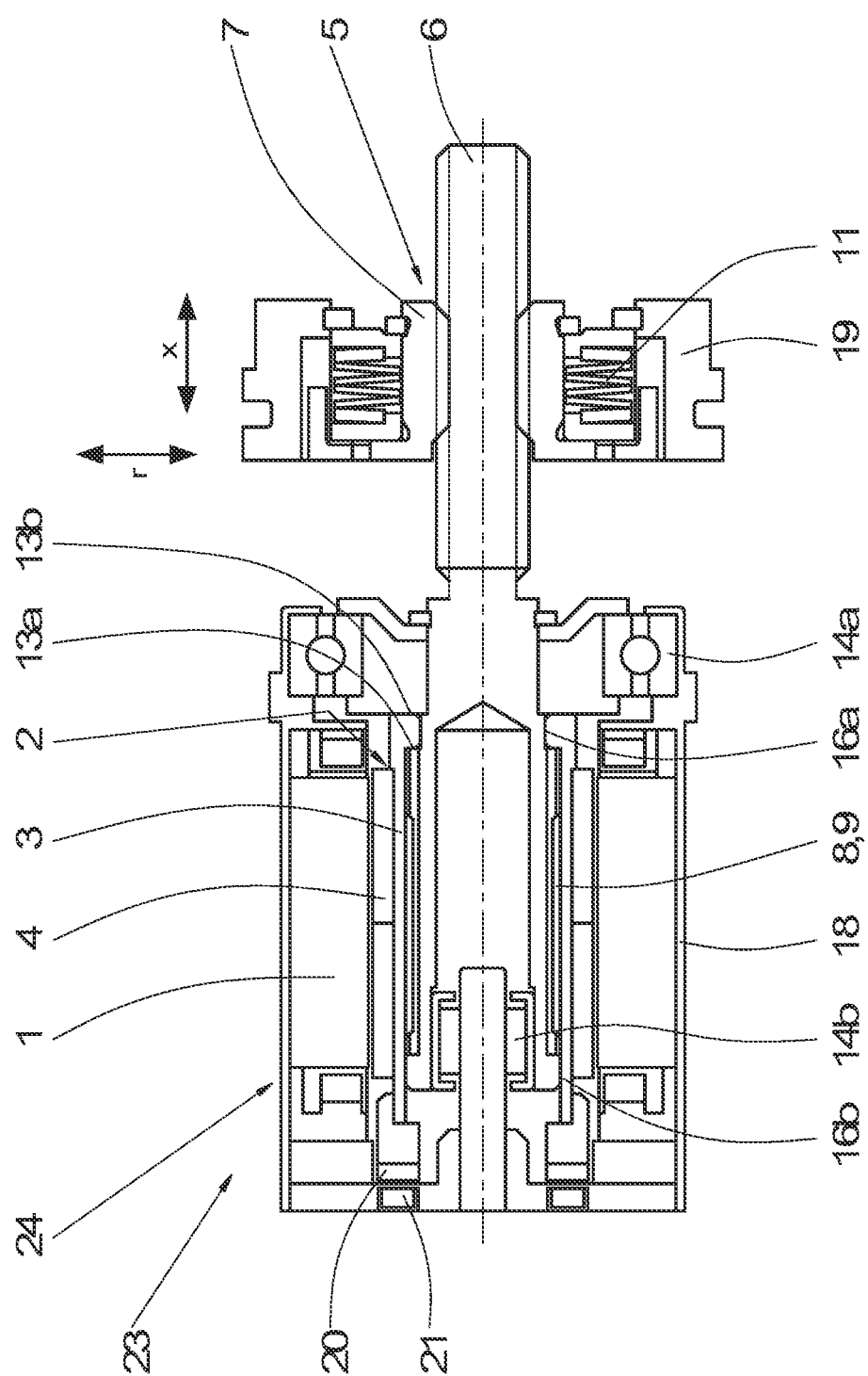
FIG. 1 shows a longitudinal sectional representation of an exemplary embodiment of an electro-mechanical actuator according to example aspects of the invention with a spindle drive, wherein a spindle of the spindle drive can be turned in relation to a housing of the electro-mechanical actuator.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 6:
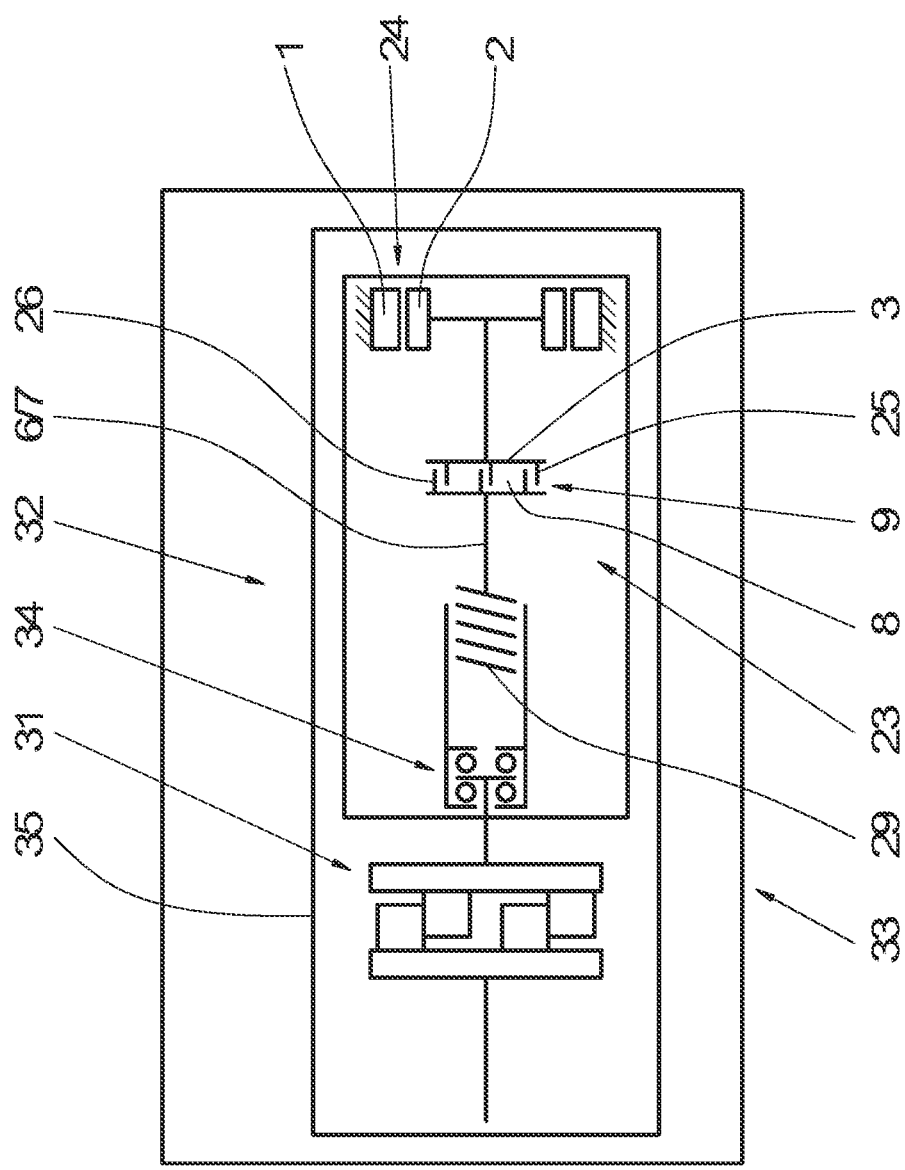
FIG. 6 shows, roughly diagrammatically and not true to scale, a vehicle having a transmission, which includes an electro-mechanical actuator, for example, an electro-mechanical actuator according to FIG. 1, 3, or 4.

FIG. 1 shows an electro-mechanical actuator 23, which can be located at least partially in a shaft 35 (not shown in FIG. 1) of a transmission 32 of a motor vehicle 33 (cf. FIG. 6). The electro-mechanical actuator 23 includes an electric machine 24 having a stator 1 and having a rotor 2. The rotor 2 includes a rotor carrier 3 and an annular magnet 4. The annular magnet 4 in the exemplary embodiment shown is multipolar magnetized and bonded onto the rotor carrier 3. This example embodiment of the magnet 4 is particularly insensitive to impact with respect to an exchange of angular momentum. Alternatively, multiple rotor magnets 4 can also be distributed around the circumference of the rotor carrier 3. In addition, the electro-mechanical actuator 23 includes a spindle drive 5 having a spindle 6 and having a spindle nut 7. Moreover, the electro-mechanical actuator 23 includes a sensor magnet 20 and an angle sensor 21.

The spindle 6 is fixedly mounted in the radial direction r and in the axial direction x with respect to a housing 18 of the actuator 23 by a fixed bearing 14a and by a floating bearing 14b. The spindle 6 can rotate within the bearings 14a, 14b. The rotor 2 is rotatably mounted on the spindle 6. Two bearing points 16a and 16b are utilized for the rotary mounting of the rotor 2. Two further bearings 13a and 13b are utilized for the axial guidance of the rotor 2. A turning motion of the rotor 2 on the spindle 6 is made possible due to the two bearing points 16a and 16b. This turning motion is limited in terms of rotation angle with respect to the spindle 6 by a driving toothing 9 having a rotational play 8. The spindle drive 5 converts a turning motion of the spindle 6 into an axial movement of the spindle nut 7. The axial force is transferred from the spindle nut 7 via a spring assembly 11 onto a housing 19 of the spindle nut 7 and, from there, actuates a shift element by an axial movement.

The spindle drive 5 can travel in opposite directions. The spindle drive 5 enables a motion transfer from rotation to translation and prevents a motion transfer from translation to rotation via self-locking. This takes place regardless of a direction of motion. The spindle drive 5 is therefore designed to be self-locking, i.e., the spindle drive 5 is configured for converting a torque into an axial force, but not for converting an axial force into a torque.

Figure 2:
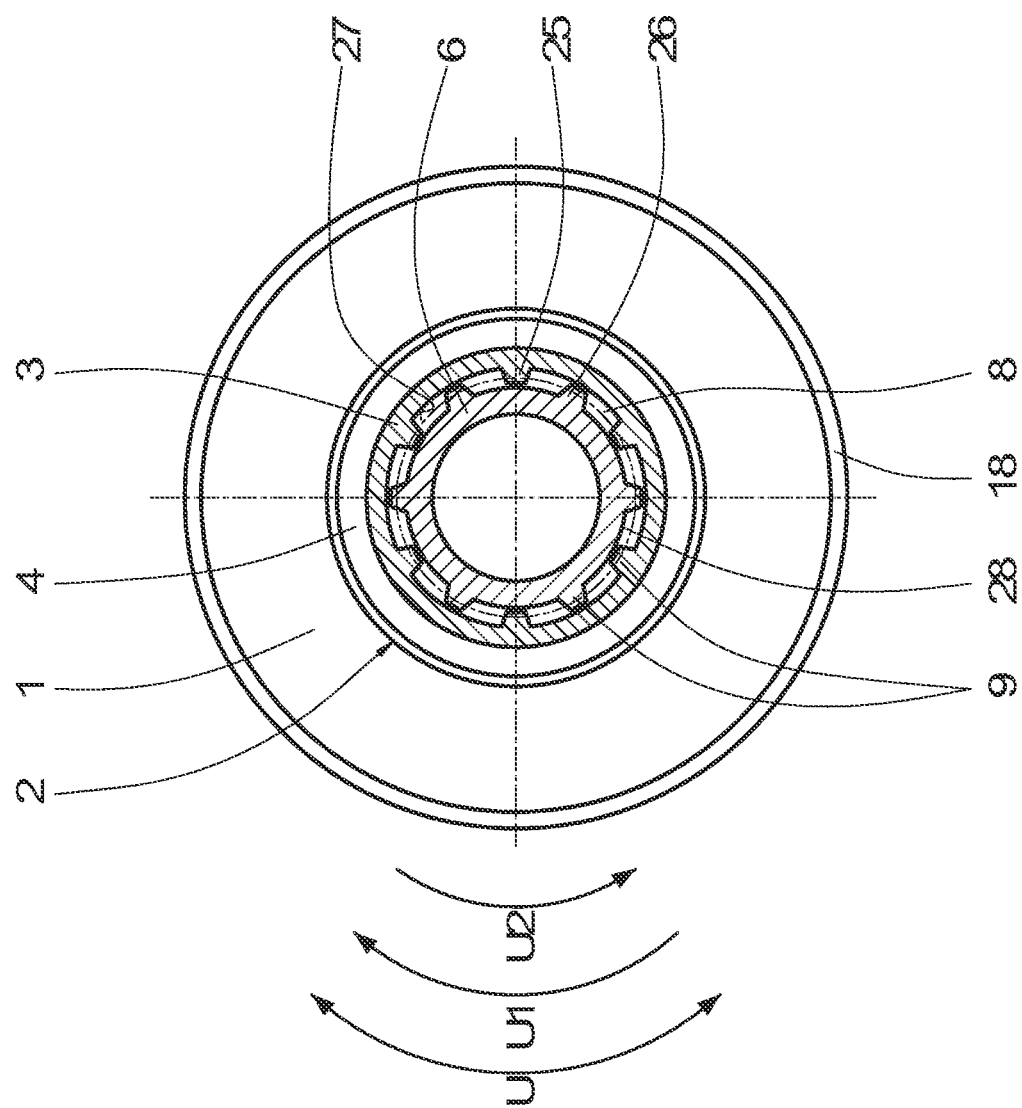
FIG. 2 shows a cross-sectional representation of the electro-mechanical actuator according to FIG. 1 in the area of a driving toothing.
Figure 3:
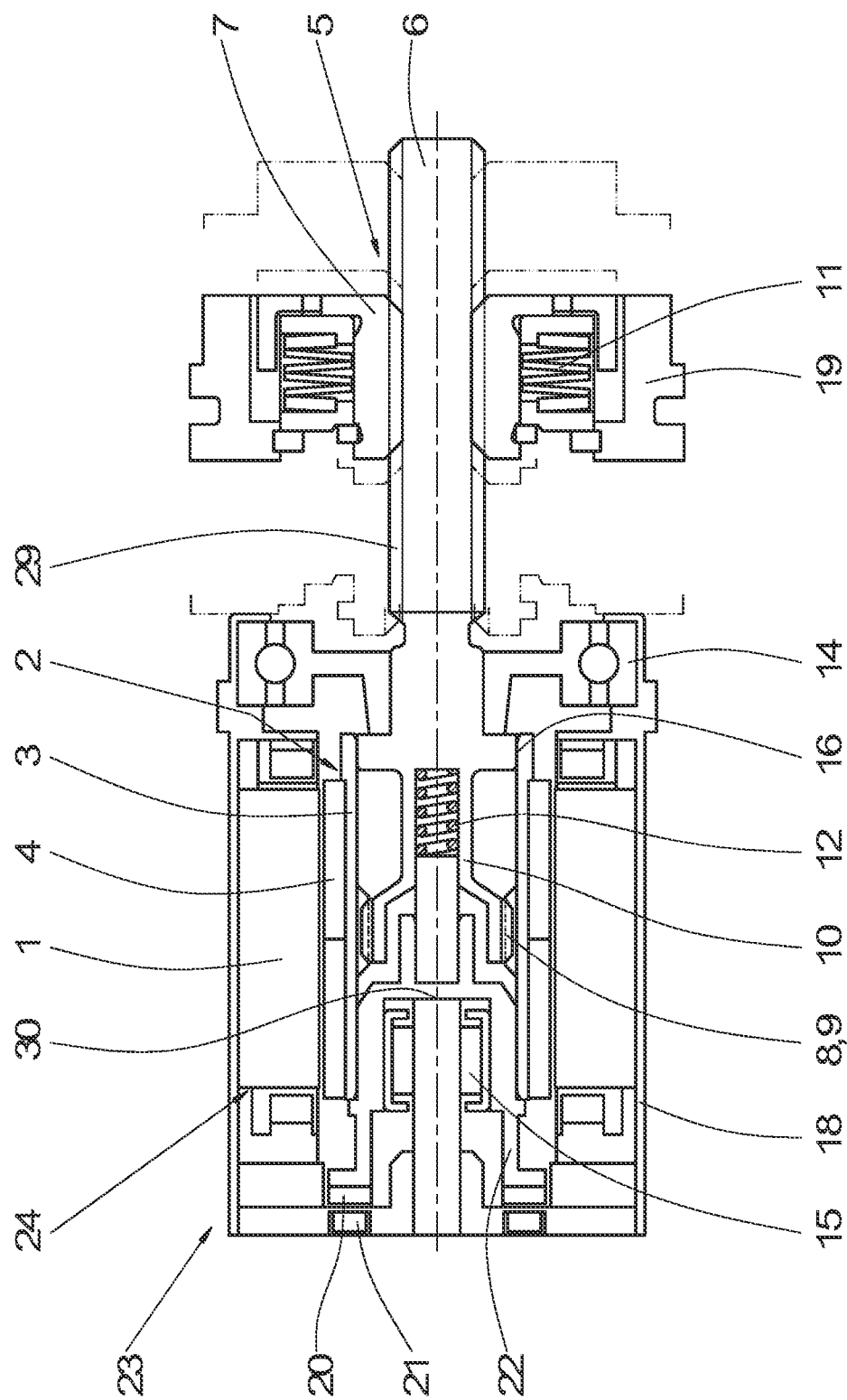
FIG. 3 shows a longitudinal sectional representation of one further exemplary embodiment of an electro-mechanical actuator according to example aspects of the invention with a torsional elasticity unit between a rotor and a spindle of the electro-mechanical actuator.
Figure 4:
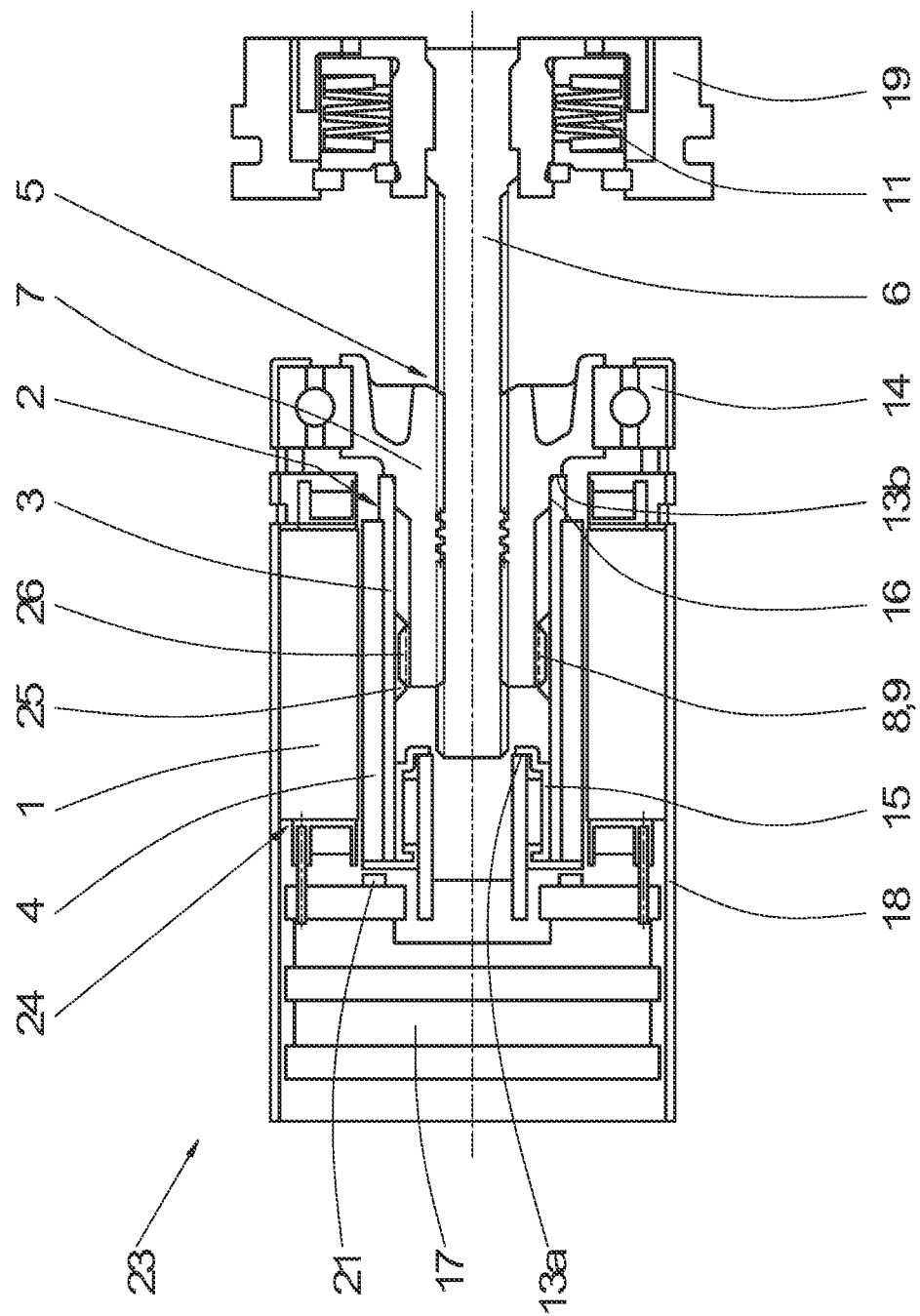
FIG. 4 shows a longitudinal sectional representation of one further exemplary embodiment of an electro-mechanical actuator according to example aspects of the invention with a spindle drive, wherein a spindle nut of the spindle drive can be turned in relation to a housing of the electro-mechanical actuator.

FIG. 2 shows a cross-section of the electro-mechanical actuator according to FIG. 1 and, similarly, also according to FIGS. 3 and 4. The driving toothing 9 includes first teeth 25, which are arranged at the rotor carrier 3 and are directed inward in the radial direction. In addition, the driving toothing 9 includes second teeth 26, which are arranged at the spindle 6 and are directed outward in the radial direction. The first teeth 25 are arranged in a circumferential direction U around an inner circumference 27 of the rotor carrier 3. The second teeth 26 are arranged in the circumferential direction around an outer circumference 28 of the spindle 6. In the exemplary embodiment shown, six first teeth 25 and six second teeth 26 are present. In the relative position of the rotor 2 with respect to the spindle 6 shown by FIG. 2, the first teeth 25 are not in engagement with the second teeth 26, because the rotational play 8 is present between the teeth 25 and 26 in the circumferential direction U. The rotational play 8 can be, for example, twenty degrees (20°). When the rotor carrier 3 is turned in the forward direction of rotation U1 or in the reverse direction of rotation U2 due to an appropriate energization of the electric machine 24, the rotational play 8 is eliminated, and so the first teeth 25 of the rotor carrier 3 can rest against the second teeth 26 of the spindle 6 and a torque can be transmitted between the rotor 2 and the spindle 6. As a result, the spindle 6 turns and displaces the spindle nut 8 in the axial direction x, as the result of which a shift element, for example, idler gears 31, can be coupled to one another or decoupled from one another in a transmission 32 of a motor vehicle 33 (cf. FIG. 6, which also shows a mounting 34 of the shift element 31).

Via the rotational play 8 of the driving toothing 9, an angular momentum of the rotating rotor 2 can be transferred to the stationary spindle 6. As a result, a torque shock can be achieved at the spindle 6, which is greater than a torque that the electro-mechanical actuator 23 can generate between the stator 1 and the rotor 2 by magnetic fields.

The electro-mechanical actuator according to FIG. 3 is a modification of the electro-mechanical actuator according to FIG. 1. The electro-mechanical actuator 23 according to FIG. 3 includes a torsional elasticity unit 10, which is arranged between the driving toothing 9, which has rotational play, and a buttress thread 29 of the spindle 6. As a result, the major proportion of the moment of inertia of the spindle is elastically decoupled and, thereby, a torque peak occurring in the driving toothing 9 during an impact/pulse is limited in terms of magnitude. As a result, the driving toothing 9 can be designed to be smaller and the acoustic excitation is reduced.

In addition, in the exemplary embodiment according to FIG. 3, the radial mounting of the rotor 2 is not implemented exclusively on the spindle 6 (as in the exemplary embodiment according to FIG. 1), but rather is implemented on the left side (according to FIG. 3) by a bearing 15 between the rotor 2 and the housing 18 of the actuator 23. As a result, the mounting of the rotor 2 becomes more direct and, thereby, enables a smaller air gap between the stator 1 and the rotor 2. In addition, the moment of inertia of the spindle 6 is reduced, which also results in a reduction of the load of the driving toothing.

Moreover, in the exemplary embodiment according to FIG. 3, the axial mounting of the rotor 2 does not take place indirectly via the spindle 6 (as in the exemplary embodiment according to FIG. 1), but rather directly via an abutting at an axial bearing 30. A preload of a spring 12 prevents the rotor 2 from axially lifting off of the axial bearing 30. Due to this example embodiment, the axial position of the rotor 2 can be highly precisely defined with a short tolerance chain and without the influence of bearing tolerances. This is advantageous, since an incorrect axial positioning of the sensor magnet 20, which is attached at the rotor 2 via an adapter flange 22, would result in an inaccurate rotation-angle detection at the angle sensor 21 and, thereby, in the case of the BLDC actuator 23 shown here, would result in a torque loss due to the commutation, which is dependent on the rotation angle.

The electro-mechanical actuator according to FIG. 4 is an example modification of the electro-mechanical actuator according to FIG. 1. Here, another further example development of the actuator from FIG. 1 is shown.

The spindle 6 and the spindle nut 7 were interchanged to such an extent that the spindle nut 7, rather than the spindle 6 (as in the exemplary embodiments according to FIGS. 1 and 3), now rotates with respect to the housing 18 of the actuator 23. As a result, the spindle nut 7 can be arranged and lengthened in the interior of the actuator 23, without the overall installation length of the actuator 23 increasing. Due to the lengthening of the spindle nut 7, the diameter of the spindle 6 can be reduced while the surface stress in the threaded drive remains unchanged. As a result, the power transmission efficiency of the spindle drive 5 improves and a greater axial force can be generated from unchanged torque of the actuator. Moreover, the moment of inertia of the spindle nut 7 can be further reduced, which results in a low torque load of the driving toothing 9, which has rotational play.

According to the exemplary embodiment from FIG. 4, the separate sensor magnet 20 is dispensed with. Instead, the rotor magnet 4 was lengthened. As a result, an angle detection by the angle sensor 21 becomes more precise, since an incorrect positioning of the sensor magnet 20 with respect to the rotor magnet 4 is structurally ruled out. In addition, an electronic control unit in the form of a control electronics system 17 is integrated in the housing 18 of the actuator 23. The electro-mechanical actuators according to FIGS. 1 and 3 can also include an appropriate electronic control unit 17.

Figure 5:
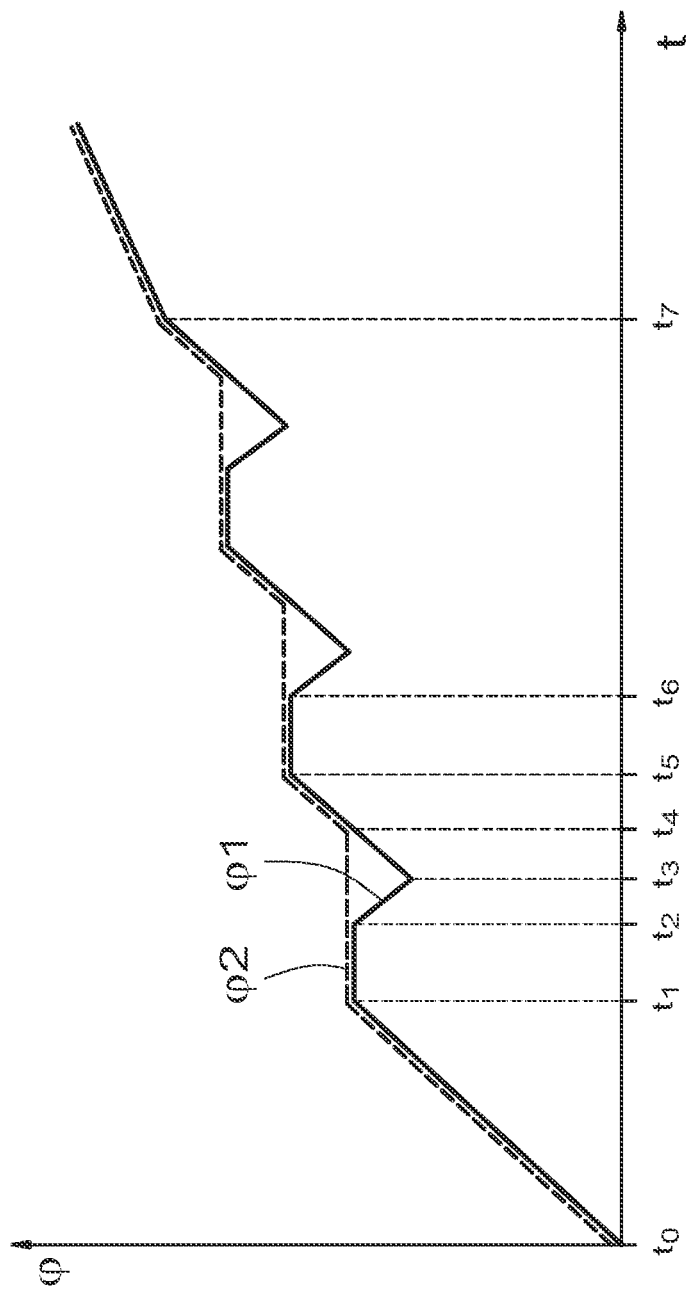
FIG. 5 shows a diagram, which represents a rotation angle of a rotor and of a rotary element of a spindle drive of an electro-mechanical actuator according to example aspects of the present invention with respect to time.

FIG. 5 shows how the rotation of the rotor 2 and the rotary drive of the spindle 6 (FIGS. 1 and 3) and of the spindle nut (FIG. 4) can be controlled by an open-loop system via the electronic control unit 17. The dashed line shows the rotation angle 100 2 of the rotating component of the spindle drive with respect to the time t. The thin solid line shows the rotation angle φ1 of the rotor 2.

At a point in time to the actuator 23 and the rotor carrier 3 begin to move and turn (with respect to the example embodiment according to FIG. 1 or 3) at the spindle 6 and at the spindle nut 7 (with respect to the example embodiment according to FIG. 4), respectively. At a point in time $t_1$ the axial force to be overcome is so great that the torque of the rotor carrier 3 that can be generated by the electric motor does not suffice to maintain the turning motion. Alternatively, this could also be the case from the beginning ($t_0$), of course. At a point in time $t_2$ the electronic control unit 17 has detected that the motor 24 is not continuing with normal operation and actuates the motor 24 in such a way that the rotor 2 rotates in reverse, in the reverse direction of rotation U2, within the rotational play 8. The fact that the motor 24 does not turn can be detected, for example, due to missing pulses of the angle sensor 21 (for example, Hall sensors) or due to the detection of an increased electrical current consumption of the motor 24 or winding of the motor 24. The reverse rotation U2 can take place, for example, in a timed manner with a defined pulse width modulation PWM.

At a point in time $t_3$ the motor 24, instructed by the electronic control unit 17, switches back to a forward movement U1 even before the motor 24 has reached the limit of the rotational play 8. At a point in time $t_4$ the first teeth 25 of the rotor carrier 3 now impact the stationary teeth 26 of the spindle drive component to be driven (the spindle 6 or the spindle nut 7) with momentum via the driving toothing 9, which has play. Due to the acting inertial forces, the rotor 2 carries the spindle drive component 6/7 along. At a point in time $t_5$ the momentum has been depleted and the electric machine 24 remains at a standstill again despite energization. At a point in time $t_6$ the standstill is detected again and the reset starts over. At a point in time $t_7$ it is detected, after possibly many such rapidly consecutively occurring impacts (magnitude one hundred and fifty (150) impacts per second), that the rotor 2 can turn even without a reset. In this case, a switch back into normal operation takes place and the movement continues in the conventional operation as a motor.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

φ1 rotor rotation angle
φ2 spindle/spindle nut rotation angle
r radial direction
x axial direction
U circumferential direction
U1 forward direction of rotation
U2 reverse direction of rotation
1 stator
2 rotor
3 rotor carrier
4 rotor magnet
5 spindle drive
6 spindle
7 spindle nut
8 rotational play
9 driving toothing with rotational play
10 torsional elasticity unit
11 spring assembly
12 spring
13a first axial guide bearing of the rotor
13b second axial guide bearing of the rotor
14a fixed bearing
14b floating bearing
15 bearing between rotor and housing of the actuator
16a first bearing point rotor on spindle
16b second bearing point rotor on spindle
17 electronic control unit/integrated control electronics system
18 housing of the electro-mechanical actuator
19 housing of the spindle nut
20 sensor magnet
21 angle sensor
22 adapter flange
23 electro-mechanical actuator
24 electric machine 25 first teeth of the rotor carrier
26 second teeth of the spindle
27 inner circumference of the rotor carrier
28 outer circumference of the spindle
29 buttress thread of the spindle
30 axial bearing
31 shift element (idler gear)
32 transmission
33 motor vehicle
34 shift element mounting
35 transmission shaft

The invention claimed is:

1. An electro-mechanical actuator (23) for generating an axial actuation force, comprising:
   an electric machine (24) with a stator (1) and a rotor (2);
   a spindle drive (5) with a rotary element (6/7) and a translatable element (7/6), the spindle drive (5) configured such that rotation of the rotary element (6/7) drives translation of the translatable element (7/6), the rotor (2) and the rotary element (6/7) of the spindle drive (5) being coupled to each other in a circumferential direction (U) such that rotation of the rotor (2) drives rotation of the rotary element (6/7) of the spindle drive (5), a rotational play (8) being formed between the rotor (2) and the rotary element (6/7) of the spindle drive (5) in the circumferential direction (U); and
   a control unit (17), the control unit (17) being configured for:
      driving the rotor (2) in a forward direction of rotation (U1);
      resetting the rotor (2) by driving the rotor (2) in a reverse direction of rotation (U2) within the rotational play (8) when the rotor (2) is at a standstill due to an excessive counter-torque of the rotary element (6/7) of the spindle drive (5), the reverse direction of rotation (U2) being opposite the forward direction of rotation (U1); and
      driving the rotor (2) in the forward direction of rotation (U1) once again after the rotor (2) has been reset in the reverse direction of rotation (U2) such that the rotor (2) turns freely with respect to the rotary element (6/7) of the spindle drive (5) in the forward direction of rotation (U1) within the rotational play (8) and drives the rotary element (6/7) with momentum upon engagement of a driving toothing (9).

2. The electro-mechanical actuator (23) of claim 1, wherein:
   the rotor (2) and the rotary element (6/7) of the spindle drive (5) are coupled to each other by the driving toothing (9); and
   the driving toothing (9) forms the rotational play (8) in the circumferential direction (U).

3. The electro-mechanical actuator (23) of claim 1, further comprising a return travel interlock configured for holding the spindle drive (5) in place while the rotor is reset in the reverse direction of rotation (U2).

4. The electro-mechanical actuator (23) of claim 1, wherein:
   the rotary element (6) of the spindle drive (5) comprises a spindle (6);
   the translatable element (7) of the spindle drive (5) comprises a spindle nut (7);
   the spindle (6) and the spindle nut (7) are coupled to each other such that rotation of the spindle (6) drives translation of the spindle nut (7);
   the driving toothing (9) comprises an internal toothing (25) of the rotor (2) and an external toothing (26) of the spindle (6);
   the external toothing (26) engages into the internal toothing (25) such that rotation of the rotor (2) drives rotation of the spindle drive (5); and
   the rotational play (8) is formed between the internal toothing (25) and the external toothing (26).

5. The electro-mechanical actuator (23) of claim 1, wherein:
   the rotary element (6) of the spindle drive (5) comprises a spindle nut (7);
   the translatable element (7) of the spindle drive (5) comprises a spindle (6);
   the spindle (6) and the spindle nut (7) are coupled to each other such that rotation of the spindle nut (7) drives translation of the spindle (6);
   the driving toothing (9) comprises an internal toothing (25) of the rotor (2) and an external toothing (26) of the spindle nut (7); and
   the rotational play (8) is formed between the internal toothing (25) and the external toothing (26).

6. The electro-mechanical actuator (23) of claim 1, wherein a rotating mass of the rotor (2) and a rotating mass of the rotating element (6) of the spindle drive (5) are decoupled from one other by a torsional elasticity unit (10).

7. The electro-mechanical actuator (23) of claim 1, wherein the electro-mechanical actuator (23) is at least partially arranged in an interior of a shaft (35).

8. The electro-mechanical actuator (23) of claim 1, further comprising:
   an axial guide bearing (30); and
   a preloaded spring (12),
   wherein the rotor (2) is pressed against the axial guide bearing (30) via the preloaded spring (12) in a play-free manner.

9. The electro-mechanical actuator (23) of claim 1, wherein the rotor (2) is mounted on the rotary element (6) of the spindle drive (5).

10. The electro-mechanical actuator (23) of claim 9, further comprising:
    a housing (18); and
    a radial bearing (15) arranged between the rotor (2) and the housing (18),
    wherein the rotor (2) is mounted on the rotary element (6) of the spindle drive (5) and in the radial bearing (15).

11. The electro-mechanical actuator (23) of claim 1, further comprising a housing (18),
    wherein the rotary element (6) of the spindle drive (5) is mounted to the housing (18) in an axial direction (x) and in a radial direction (r).

12. The electro-mechanical actuator (23) of claim 1, further comprising a sensor (21) configured for detecting a rotation ($\varphi 1$) of the rotor (2).

13. A motor vehicle transmission (32), comprising the electro-mechanical actuator (23) of claim 1.

14. A motor vehicle (33), comprising the motor vehicle transmission (32) of claim 13.

15. An electro-mechanical actuator (23) for generating an axial actuation force, comprising:
    an electric machine (24) with a stator (1) and a rotor (2);
    a spindle drive (5) with a rotary element (6/7) and a translatable element (7/6), the spindle drive (5) configured such that rotation of the rotary element (6/7) drives translation of the translatable element (7/6), the rotor (2) and the rotary element (6/7) of the spindle drive (5) being coupled to each other in a circumferential direction (U) such that rotation of the rotor (2) drives rotation of the rotary element (6/7) of the spindle drive (5), a rotational play (8) is formed between the rotor (2) and the rotary element (6/7) of the spindle drive (5) in the circumferential direction (U); and a return travel interlock configured for holding the spindle drive (5) in place while the rotor (2) is reset in a reverse direction of rotation (U2).

16. A motor vehicle transmission (32), comprising the electro-mechanical actuator (23) of claim 15.

17. A motor vehicle (33), comprising the motor vehicle transmission (32) of claim 16.

\* \* \* \* \*